US008453544B2

(12) United States Patent   (10) Patent No.: US 8,453,544 B2
Cucchi   (45) Date of Patent: Jun. 4, 2013

(54) FEEDER OF RODS WITH ADVANCEMENT CONTROL

(75) Inventor: Pietro Cucchi, Bussero (IT)

(73) Assignee: Pietro Cucchi S.p.A., Bussero, Milan (IT)

( * ) Notice: Subject to any disclaimer, the term of this patent is extended or adjusted under 35 U.S.C. 154(b) by 434 days.

(21) Appl. No.: 12/662,784

(22) Filed: May 3, 2010

(65) Prior Publication Data

US 2010/0278619 A1 Nov. 4, 2010

(30) Foreign Application Priority Data

May 4, 2009 (IT) .............................. MI2009A0756

(51) Int. Cl.
*B23B 13/128* (2006.01)
*B23Q 7/06* (2006.01)
(52) U.S. Cl.
USPC .................. 82/1.11; 82/118; 82/127; 82/126
(58) Field of Classification Search
CPC ................................................... B23B 12/128
USPC .................... 82/126, 127, 118, 1.11; 414/14, 414/15, 16, 17, 18
See application file for complete search history.

(56) References Cited

U.S. PATENT DOCUMENTS

| 3,874,520 | A | * | 4/1975 | Scheler | ........................... | 414/18 |
| 5,970,830 | A | * | 10/1999 | von Niederhausern | ......... | 82/127 |
| 6,302,005 | B1 | * | 10/2001 | Albasateneh | ................... | 82/126 |
| 6,834,539 | B2 | * | 12/2004 | Faigle | ........................ | 73/114.77 |
| 7,302,877 | B2 | * | 12/2007 | Cucchi | ............................ | 82/124 |
| 7,461,577 | B2 | * | 12/2008 | Nakaya et al. | .................. | 82/124 |
| 7,552,671 | B2 | * | 6/2009 | Neumann | ........................... | 91/1 |
| 2002/0008358 | A1 | * | 1/2002 | Taglang | ....................... | 279/4.02 |
| 2007/0151429 | A1 | * | 7/2007 | Nakaya et al. | .................. | 82/126 |

FOREIGN PATENT DOCUMENTS

| EP | 0600783 |   | 6/1994 |
| EP | 1316374 |   | 6/2003 |
| EP | 1574285 |   | 9/2005 |
| EP | 1637256 |   | 3/2006 |
| GB | 2157987 | A * | 11/1985 |
| JP | 2007315998 | A * | 12/2007 |

OTHER PUBLICATIONS

Search Report issued Nov. 24, 2009 from Italian Patent Office in corresponding Italian patent application No. MI20090756.

* cited by examiner

*Primary Examiner* — Will Fridie, Jr.
(74) *Attorney, Agent, or Firm* — Jacobson Holman PLLC

(57) ABSTRACT

A feeder for rods into a lathe by a motorized thruster for sliding and pushing a rod along a guide towards a processing lathe until the rod is taken by the lathe. An automatic control device actuates the thruster to advance according to a first thrust value and a sensor detects the movement of the thruster. If the sensor detects a minimum movement or no movement at all a thrust increase is commanded up to a predetermined maximum value. If the thruster does not move at all, this indicates jamming.

7 Claims, 1 Drawing Sheet

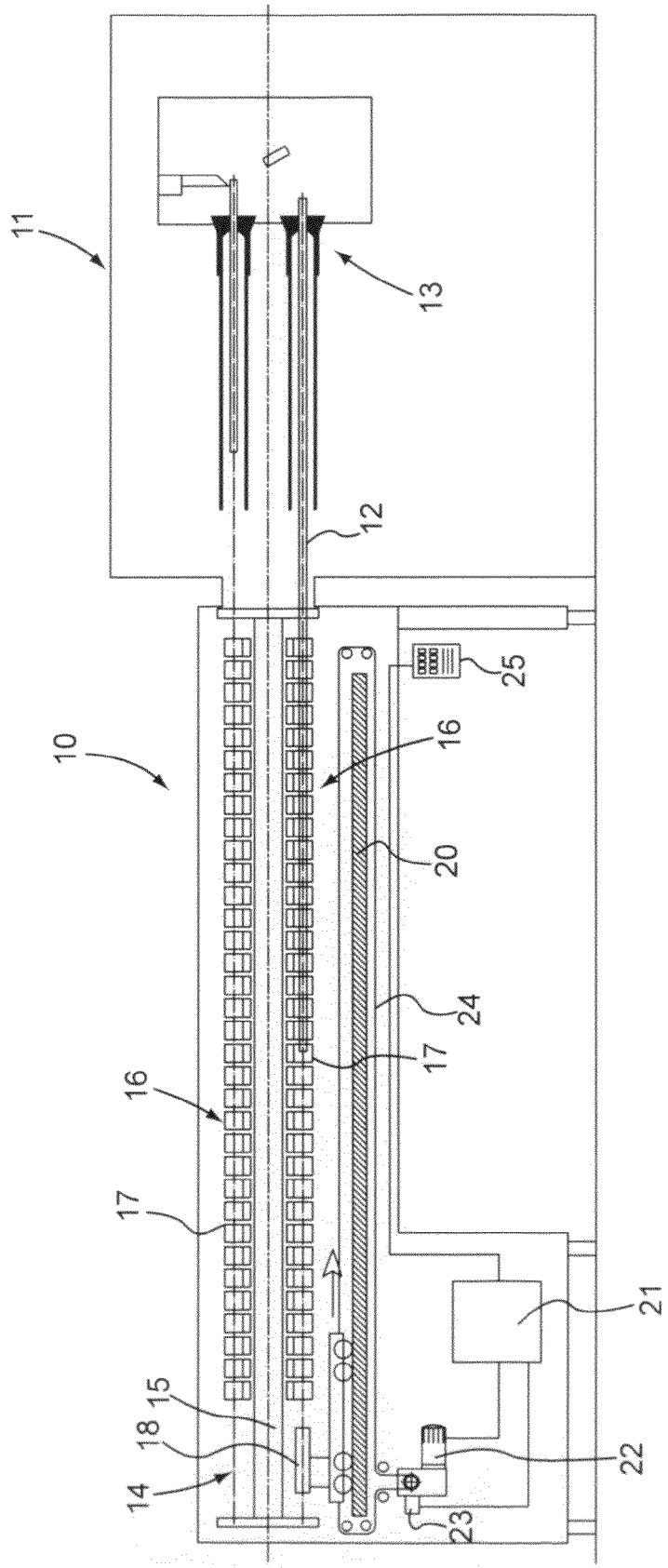

FEEDER OF RODS WITH ADVANCEMENT CONTROL

BACKGROUND OF THE INVENTION

This application has a priority of Italian no. MI2009A 000756 filed May 4, 2009, hereby incorporated by reference.

FIELD OF THE INVENTION

The present invention refers to a feeder for rods for feeding automatic lathes and an operating method thereof.

STATE OF THE PRIOR ART

Available in the market over the last years are simplified multi-spindle rod loaders, referred to as "feeders", for feeding rods to be machined into an automatic lathe.

These machines are different from traditional loaders in that they do not have a rod-thruster with an elastic gripper at the head which seizes and accompanies the rod during the entire travel thereof for machining in the lathe.

These machines only have a very short thruster which has the sole purpose of thrusting the rod until it is inside the gripper of the lathe. There is only one such thruster for all channels that is connected to a transmission fixed onto the framework.

The advancement of the rod during the machining is guaranteed by the lathe and no longer by the loader and the piece that remains at the end of the machining is not recovered by the loader, but is thrusted into the tools area of the lathe by the new incoming rod.

In order to advance the rod during the machining, the lathes may essentially exploit one of the following two methods:
1) drawing the rod by means of a special device positioned in the tools area of the lathe;
2) using a drawing element with a counter-gripper positioned in the spindle.

In the first case, when the lathe opens the gripper to allow the advancement of the rod, the end of the rod is seized by an auxiliary gripper, which draws it into the tools area by a desired amount.

Upon completion of the rod, the thruster pushes the new rod into the gripper, whose end eliminates the remaining piece and it is then seized by the auxiliary gripper.

In the second case, the rod is moved forward by a counter-gripper. The latter is simply a very sturdy elastic gripper always at contact with the rod and which is moved to and fro by a drawing element, which is simply a pipe connecting this counter-gripper to a mechanical system which provides for the movement.

When the gripper opens, the counter-gripper moves forward by the desired measure moving the rod forward; once the gripper closes, the counter-gripper returns to its idle position sliding on the rod which remains locked by the gripper.

It is clear that in the first case much less force is required for positioning the rod, given that the force of the counter-gripper is not required to be overcome. In the second case, on the contrary, the required force depends on the type and on the seizure of the counter-gripper. This implies, for example, that the force varies on the same lathe depending on the diameter of the rod being machined, given that small rods require small counter-grippers (and thus they require little force to be opened) while large rods may even require tens of kilograms of thrust force.

Thrust differences may vary even considering the same machining diameter, depending for example on the geometry or on the material of the piece to be constructed.

Feeders of the prior art use constant force hydraulic actuations or electric actuations with manually controlled torque restrictors.

In case of advancement with hydraulic cylinder, a pressure is set to ensure the feeding of the rod into the sturdier counter-gripper, pressure which is then used in any other case. However, there arises the risk of bending the small rods or ruining parts of the lathe in case of failed or faulty feeding.

Having manually adjustable frictions requires the intervention of an operator on an adjustment wheel at each change of machining operation, otherwise the same risks of advancement with the hydraulic cylinder or failure to introduce the rod would arise.

A general object of the invention is that of overcoming the abovementioned drawbacks by providing a feeder and a method for operation thereof capable of allowing safe insertion of the rod and capable of avoiding twisting or breaking, even regardless of the rod-drawing system that is used in a lathe served by the feeder.

SUMMARY OF THE INVENTION

Conceived for such purpose, according to the invention, is a method for feeding rods into a lathe with a feeder of rods comprising a motorized thruster for running and pushing a rod along a guide towards a processing lathe until the rod is taken by the lathe, comprising the steps, operated by an automatic control device, of:
a) actuating the thruster to advance according to a first thrust value;
b) detecting the movement of the thruster with a sensor;
c) commanding an increase in thrust of the thruster by a predetermined value if the sliding detected at the previous point is lower than a set value;
d) repeating points b) and c) until the thruster advances correctly or until a predetermined value of maximum thrust is achieved without detecting a desired advancement, which indicates jamming.

Still conceived according to the invention is a feeder for feeding rods into a lathe, comprising a motorized thruster for running and pushing a rod along a guide towards a processing lathe until the rod is taken by the lathe, characterized in that it comprises a geared motor for the running of the thruster, a sensor for detecting the movement of the thruster and a control unit which receives the signal from the sensor and consequently actuates the geared motor starting from a first thrust value, increasing it, if the sensor detects an advancement of the thruster which is lower than a certain value or zero, until a predetermined maximum thrust value is reached.

DESCRIPTION OF THE DRAWING

FIG. 1 is a side elevational view of the feeder and lathe.

DETAILED DESCRIPTION OF THE INVENTION

For further clarification of the explanations of the innovative principles and advantages of the present invention with respect to the prior art, described hereinafter—with the help of the attached drawing—is an embodiment applying such principles.

Referring to FIG. 1, a feeder 10 is shown associated with a known automatic lathe 11 for feeding rods 12 to the spindles 13 of the lathe to allow machining thereof.

The lathe is of the known type and thus it shall not be shown or described hereinafter further in detail. It shall have known systems for seizing and moving the introduced rods.

The feeder 10 comprises a guide drum 14 which rotates around an axis 15 to follow the rotations of the spindles of the lathe. The drum in turn comprises a plurality of guide channels 16 parallel to the axis 15 and distributed on a circumference thereof. The guide channels are advantageously made using a series of elements 17, for example C-shaped and arranged facing each other in pairs, as known in the industry.

A short thruster 18 is motorized (for example by means of a car 19 that runs along a track 20 parallel to the guides), in such a manner to be fed and slide axially along the currently nearest channel 16, i.e. at the position of feeding a new rod 12 into lathe.

A known loading device (not shown) may be provided for radially loading a new rod into the channel. The thruster advances to thrust the rod from behind along the channel and into the lathe. Once the front end of the rod is seized by the special known means of the lathe, the thruster may return back and the rod is moved axially by the lathe itself. The drum rotates to follow the rotations of the spindle of the lathe between the various operating stations and maintain the various rods—that are gradually fed—guided at the rear part.

In order to radially feed a new rod into the channel, each channel is made up of a lower semi-channel and an upper semi-channel mutually moveable to open or close the channel, according to a per se known method and thus not shown or described herein further.

The feeder comprises an intelligent control unit 21 (of the per se known type, for example a suitably programmed microcontroller) which controls the movement of the thruster by means of a geared electric motor 22 and a sensor 23 which detects the movement of the thruster along its travel for thrusting the rod.

Advantageously, the geared motor 22 moves the support car 19 of the thruster along the track 20 by means of a double link steel chain 24 which slides parallel to the track. The sensor 23 is advantageously an incremental encoder (a zero process which may easily be imagined by a man skilled in the art) or an absolute encoder.

The control system 21 has a memory having minimum and maximum advancement thrust values and, advantageously, an advancement speed of the thruster. The thrust may be represented by the torque generated by the geared motor. The control unit may command the geared motor to vary the torque and thus the thrust thereof.

Advantageously present is a palmtop keypad 25 by means of which an operator enters the minimum and maximum thrust values, as well as the speed of advancement of the thruster.

When the thruster advances to feed a new rod, the control unit 21 commands the thruster in such a manner that a first feeding attempt is performed using the lowest thrust value.

Should the feeding into the gripper not be performed correctly, such event is detected by the encoder which communicates the position to the thruster. The sensor in such case detects for example a forward movement lower than a predetermined amount (for example, corresponding to the complete feeding of the tip of the rod into the grippers of the lathe) or even equivalent to zero, after the rod is possibly advanced over a section up to the grippers of the lathe. Thus, the control unit provides for another attempt with thrust increased by a given amount of predetermined increase. Even in case such value does not produce the correct advancement, there occurs a further increase and a new attempt. The attempts continue until the maximum predetermined value is achieved or until the rod starts advancing correctly into the lathe.

Alternatively, it may also be provided for that if no advancement occurs at the minimum thrust value the system directly passes to an attempt with a maximum thrust value. This may be, for example, selected by the operator.

Pulling back of the thruster (by a predetermined measure, which could be set by the operator) may also be provided for before each attempt. Also the speed of the new attempt may be set by the operator.

Thus, this leads to a high control when feeding the gripper to overcome the drawbacks of traditional feeders.

At this point, it is clear how the preset objects are attained. An operator may set (or select from a plurality of preset values) the advancement parameters of the thruster according, for example, to the characteristics of the rods to be fed to the lathe. This prevents feeding with more force than required and promptly detecting problems related to jamming that could give rise to problems.

Obviously, the description outlined above of an embodiment applying the innovative principles is indicated for exemplifying such innovative principles and thus shall not be deemed to restrict the scope of the invention described herein. For example, the feeder may comprise other known devices for the operations of loading, feeding and guiding the rods.

What is claimed is:

1. A method for feeding rods into a lathe by a feeder of rods having a motorized thruster for running and pushing a rod along a guide towards a processing lathe until the rod is taken by the lathe, comprising the steps, operated by an automatic control device, of:
    a) entering a predetermined minimum thrust value and a predetermined maximum thrust value into a memory of a control unit;
    b) actuating the thruster to advance according to a first thrust value corresponding to said predetermined minimum value;
    c) detecting the movement of the thruster with a sensor;
    d) commanding an increase in thrust of the thruster by a predetermined value if the movement detected at the previous point is lower than a predetermined amount;
    e), repeating points c) and d) until the thruster advances correctly or until said predetermined maximum thrust value is reached without detection of a desired advancement, indicative of jamming.

2. Method according to claim 1, wherein before step e) a step of pulling back the thruster by a predetermined distance is carried out.

3. Method according to claim 1, wherein the first increase in thrust brings the thrust from the minimum thrust value directly to the maximum thrust value.

4. Feeder for feeding rods into a lathe, comprising
    a motorized thruster for running and pushing a rod along a guide towards a processing lathe until the rod is taken by the lathe,
    a geared motor for running of the thruster,
    a sensor for detecting movement of the thruster, and
    a control unit containing in a memory a predetermined minimum thrust value and a predetermined maximum thrust value and receiving a signal from the sensor to consequently actuate the geared motor starting from a first thrust value corresponding to said predetermined minimum value, increasing it, if the sensor detects an advancement of the thruster which is lower than a predetermined amount or is zero, until a said predetermined maximum thrust value is reached.

5. Feeder according to claim 4, wherein the memory in the control unit is programmable by the operator through a keypad.

6. Feeder according to claim 4, wherein the geared motor commands the thruster through a transmission chain and a car that runs along a track parallel to the guide and which supports the thruster.

7. Feeder according to claim 4, wherein the sensor is an absolute or incremental position encoder.

* * * * *